Patented Mar. 2, 1937

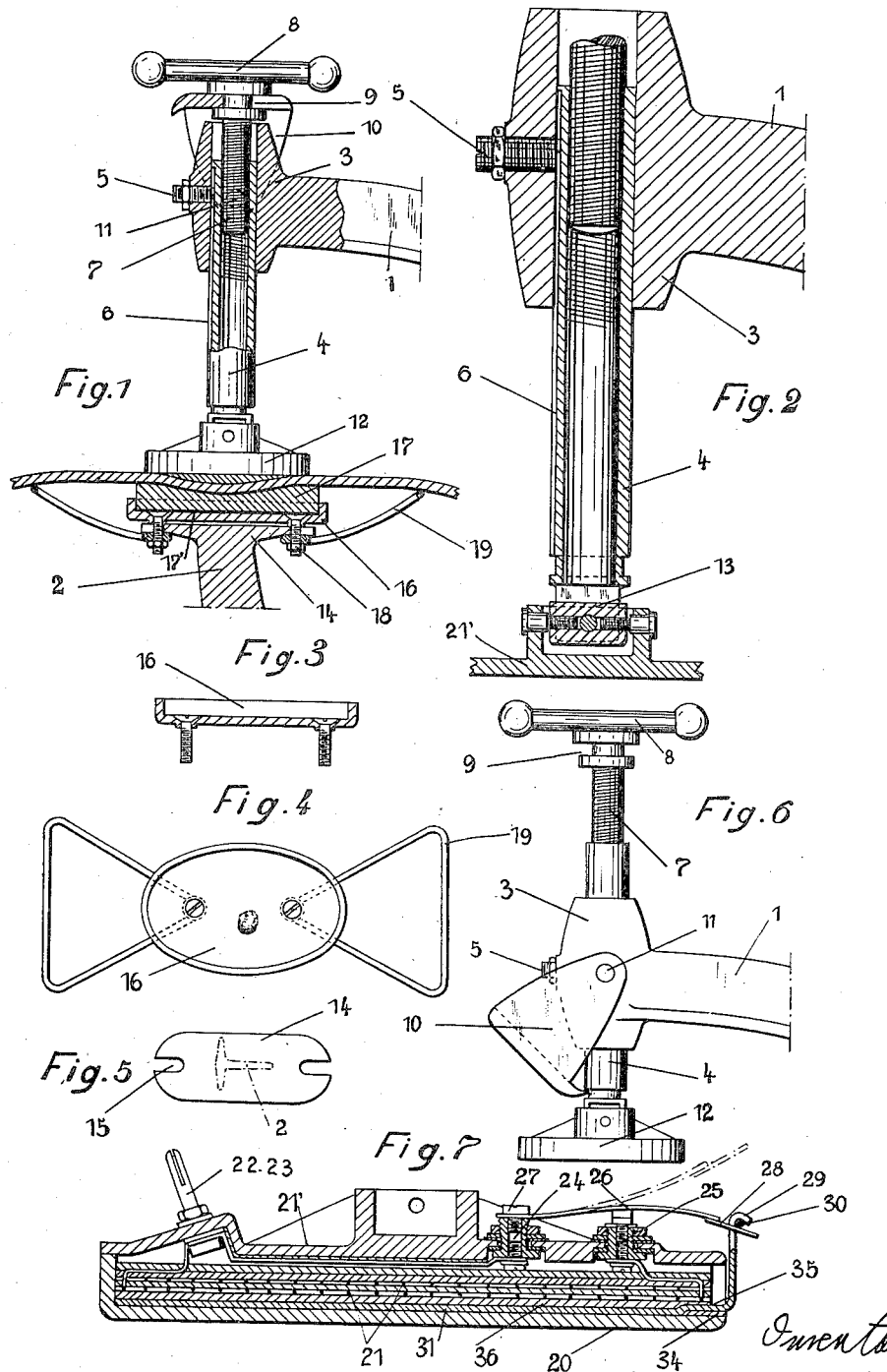

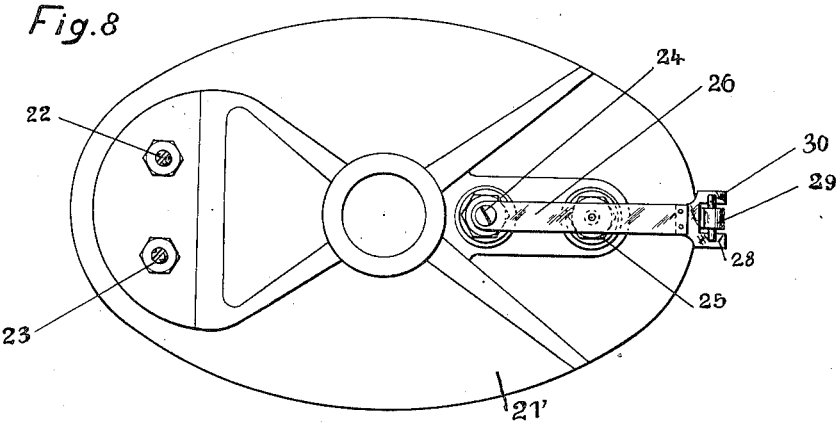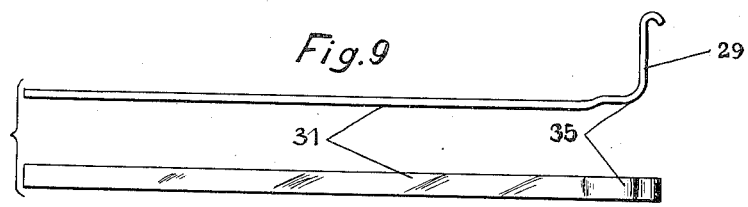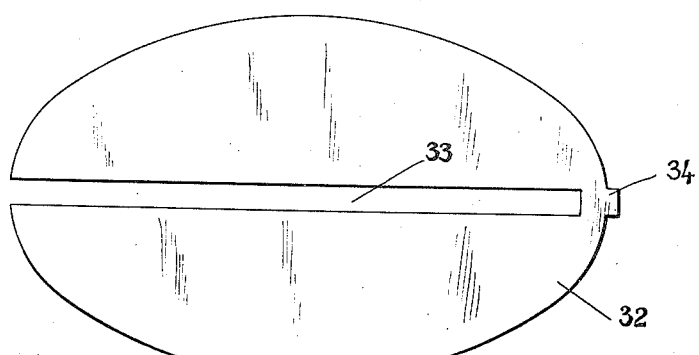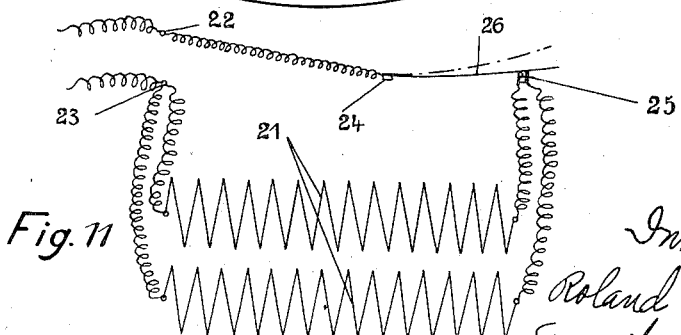

2,072,497

UNITED STATES PATENT OFFICE 2,072,497

APPARATUS FOR ELECTRICALLY VULCANIZING INDIA RUBBER PIECES

Roland Albert Ernest Dupont, Epernay, France

Application July 13, 1935, Serial No. 31,295
In France November 30, 1934

6 Claims. (Cl. 18—18)

This invention has for its object to provide a vulcanizing press in which the heating plate is carried by a smooth bar that is slidably mounted in a support; the support has provisions thereon for holding the bar with the plate in elevated position or for cooperation with a locking screw and hand-wheel carried by the bar by which the plate is forced into pressure engagement with the work; the work is held on a support or counter-pressure plate of vulcanized rubber which is depressible for purposes later explained.

Further, the invention has for an object to improve the construction of the heating plate or member and to provide an improved thermally controlled circuit breaker for an electrical heating element located within the heating plate.

Further, the invention has for its object to provide a support for the work, the support including a base on which is detachably mounted a holder for the counter-pressure plate, the holder having provisions for restraining the lateral deformation of the counter-pressure plate under vertical pressure.

Further, the invention includes the provision of a linen cover for the counter-pressure plate and a linen backing for the patch piece of rubber, the former serving to restrain the counter-pressure plate against being crushed under pressure and the latter serving to impede the formation of bubbles and to facilitate the thinning of the edges of the patch and, after vulcanization, to give a bright appearance to the patch.

In the drawings:

Fig. 1 is a sectional view of the press head with the sliding bar carrying the heating block pressing on the piece to be vulcanized.

Fig. 2 shows, on a larger scale, the press head, the smooth bar and the means for mounting the same together with the heating block.

Figs. 3, 4, and 5 represent in detail the support of the counter pressure plate with the side arms and the frame end on which the support is mounted.

Fig. 6 shows the particulars of the holding stirrup together with the box in raised position.

Fig. 7 is a longitudinal section, on an enlarged scale, of the heating block with its interruptor combined with the hooking arrangement.

Fig. 8 is a plan view of the box.

Figs. 9–11 show details of the box.

The press which can be fixed with its base upon a work bench has two arms 1 and 2. The head 3 is formed so as to receive a smooth and hollow bar 4 guided by a screw 5 and a groove 6. It is coupled to a screw 7 with hand wheel 8 for vertical feeding.

Under the hand wheel is a neck 9 in which is hooked a stirrup 10 linked in 11. If the bar 4 is brought down and the hand wheel 8 operated, then the latter will exert a pressure on the heating block 12 while engaging with the stirrup 10.

On other hand if the pressure is removed and the stirrup lowered around 11, the bar being raised into the head, the box 3 is hooked and it is possible then to proceed to prepare the work for vulcanization.

The bar 4 is connected to the block 12 by means of the universal joint 13. The bar is hollow in order to avoid, as much as possible, loss of heat due to conductivity. The arm 2 of the press has a plate 14 with notches 15 used for fastening a support 16 into which fits a counter pressure plate 17 of vulcanized india-rubber of a suitable consistence and thickness. Bolts 18 are used to secure the support 16 in place as well as to fasten the brackets 19 that support the article to be repaired.

The article to be repaired is placed on the plate 17 and the piece of india-rubber which is to be vulcanized thereto is placed on top. On only one or on both faces of the plate 17 is located a linen 17' which prevents lateral crushing and deformation of the pieces.

The vulcanizing device comprises a box 20 having inside one or several electric resistances 21 conveniently insulated. On the box 20 is placed the cover 21' carrying the terminals 22 and 23 to which are connected the junction boxes.

Two other terminals are arranged at 24 and 25. The terminal 24 has a flexible blade 26 secured by a screw 27. The blade 26 closes the circuit on the terminal 25 and is extended to bring its insulated extremity 28 opposite a hook 29 under which is inserted a metal piece 30 having a low melting point and the ends of which bear against the extremity of the blade 26.

The hook 29 is independent of the box 20, being built at the end of a blade 31 of a metal which is good conductor of heat, as silver or copper. The insulated plate 32 fitted at the bottom of the box 20 is cut out with an opening 33 on the long axis leaving a nose 34. In the opening or slit 33 is located the blade 31 which also contacts with the box wall. Opposite the nose 34, the blade has a curve 35 extended to the hook 29.

The blade 31 is heated on each of its faces by two elements the calorific grades of which are different. From one side, the box bottom transmits its heat to the blade 31, and on the other hand, the asbestos plate 36 covering the notched plate 32 communicates to the same the heat directly received from the heating resistance.

The different heat grades taken from two places unite into the blade 31 giving the required grade of temperature which is then quickly led to the hook 29 and to the safety fuse 30 which softens on getting warm and finally breaks at the right desired grade of heat.

The operation of the device is effected as follows:

The article to be repaired, being conveniently prepared, is positioned on the india-rubber plate 17. On the spot to be repaired is disposed a plate of non-vulcanized india-rubber of proper size. The bar 4 and the heating block are brought down and the stirrup 10 is replaced in its original position and the required pressure is given to the block 20 by operating the hand wheel 8. The flexible blade is set by the insertion between it and the hook 29 of the safety fuse 30. The current is connected to the terminals 22 and 23. The block 20 gets warm, softens the piece to be vulcanized which extends and becomes very thin at its edges owing to the yieldingness of the plate 17 depressed under the pressure of the box.

Owing to the increasing heat, the safety fuse 30 softens and under the action of the spring blade 26 breaks, thus automatically disconnecting from the terminal 25. The vulcanization is completed by the residual heat in the vulcanizing block or plate. Thus there is no risk of an over-vulcanization, and the apparatus may therefore be left in such a position as long as desired, without any fear of burning the india-rubber. The characteristic of the interruptor is to be found in the use of a metallic alloy with low melting point and breaking by molecular disaggregation under the action of heat. This special alloy is formed of 10 parts lead, 10 parts zinc and 4 parts bismuth, or other suitable proportions of the said three essential metals.

Having now described the object of this invention and in which manner same is to be performed, what I claim is:

1. In a device for electrically vulcanizing parts of rubber, the combination with a framework having two arms and a guiding head, of a tubular rod supporting a heating block and sliding in the guiding head in order to feed the heating block rapidly against the work, said tubular rod containing a locking device, a stirrup pivoted on said guiding head and adapted to be moved to a raised position for cooperation with said locking device in order that pressure may be exerted upon the heating block, said stirrup being movable to a lowered position as a hook to maintain the hollow rod and the locking device in a raised position for the purpose of permitting manipulation of the heating block and the work, a flexible counter-pressure plate on said support to receive the work to be vulcanized, means for heating the block electrically, and a thermally operated means to open the electric circuit when the desired temperature has been attained.

2. In a device for electrically vulcanizing parts of rubber, the combination with a framework having two arms and a guide head, of a thin rod carrying a heating block and slidable in said guide head and adapted to advance the heating block rapidly upon the parts to be vulcanized or conversely to release the same, said rod having an internal screw thread, a locking screw having a controlling hand wheel and threaded into said rod, and a stirrup articulated to said guide head and cooperative with said locking screw for transmitting pressure to the rod.

3. In a device for electrically vulcanizing parts of rubber, the combination of a slidably supported smooth rod and a locking screw having a hand wheel and cooperating with said rod, a pivotally mounted stirrup serving as a holding element when raised and engaged under the hand wheel of the locking screw and serving to hold the rod in a raised position when the stirrup is disengaged from the locking screw and turned back and engaged with the said rod.

4. In a vulcanizing device for vulcanization of rubber, a heating block comprising a chambered body and a cover for the same, a rod for carrying said block, a resistance unit within the block, current leads connected to said resistance unit in an electric circuit, a resilient blade in said circuit and mounted on said block, said blade having an insulated bifurcated portion at one end, and being mounted at its other end, a hook entering between the bifurcations of the blade, a fixed contact on the block in the electric circuit for cooperation with said blade to close the circuit, a fusible element extending transversely beneath the hook and over the furcations to maintain the blade under strain and assure the closing of the electric circuit.

5. In a device for electrically vulcanizing rubber parts, an electric heating block provided with a chamber, a resistance unit in said chamber, a circuit controller carried by the heating block and including a resilient bar, a copper blade projecting into the chamber of the block to be heated by the temperature of the resistance unit and by the temperature of the adjacent wall of the block, a hook at the end of said blade serving to retain a fusible element located between it and the resilient rod to maintain the resilient rod under strain against the heat of the block.

6. In a vulcanizer, a heating block having a chamber, a resistance unit located in said chamber, an asbestos layer located beneath said unit, an insulation plate located between said asbestos layer and the bottom of the block and having a longitudinal slot, said block having an opening, a blade located in said slot and having a portion projecting through said opening and provided with a hook, a thermal circuit breaker on said block in the resistance circuit and including a resilient element having a fork to straddle said hook, and a fusible pin interposed between said hook and said fork to hold said resilient element under tension while the circuit is closed, said fusible element being adapted to fuse when said hook reaches a predetermined temperature.

ROLAND ALBERT ERNEST DUPONT.